United States Patent
Stinson (10) Patent No.: US 8,468,069 B2
(45) Date of Patent: Jun. 18, 2013

(54) AUTOMATIC MODIFICATION OF FINANCIAL RECORD PARAMETERS

(75) Inventor: Joseph Michael Stinson, Arlington, TX (US)

(73) Assignee: Bank of America Corporation, Charlotte, NC (US)

(*) Notice: Subject to any disclaimer, the term of this patent is extended or adjusted under 35 U.S.C. 154(b) by 113 days.

(21) Appl. No.: 12/694,618

(22) Filed: Jan. 27, 2010

(65) Prior Publication Data

US 2011/0106672 A1 May 5, 2011

Related U.S. Application Data (60) Provisional application No. 61/256,458, filed on Oct. 30, 2009.

(51) Int. Cl.
*G06Q 40/00* (2006.01)
(52) U.S. Cl.
USPC ............................................. 705/30
(58) Field of Classification Search
USPC ............................................. 705/30
See application file for complete search history.

(56) References Cited

U.S. PATENT DOCUMENTS

| | | | |
|---|---|---|---|
| 6,697,999 B1* | 2/2004 | Breuer et al. | 715/236 |
| 2004/0138994 A1* | 7/2004 | DeFrancesco et al. | 705/38 |
| 2004/0153386 A1* | 8/2004 | Eckerdt | 705/36 |
| 2005/0102191 A1* | 5/2005 | Heller | 705/26 |
| 2005/0102192 A1* | 5/2005 | Gerrits et al. | 705/26 |
| 2006/0178944 A1* | 8/2006 | Katter et al. | 705/26 |
| 2007/0288942 A1* | 12/2007 | Cahill et al. | 719/329 |
| 2008/0103949 A1* | 5/2008 | Lobana et al. | 705/35 |
| 2009/0076966 A1* | 3/2009 | Bishop et al. | 705/67 |
| 2009/0287628 A1* | 11/2009 | Indeck et al. | 706/47 |
| 2010/0037219 A1* | 2/2010 | Chen et al. | 717/176 |
| 2010/0121730 A1* | 5/2010 | Roden et al. | 705/26 |

* cited by examiner

*Primary Examiner* — Ryan Zeender
*Assistant Examiner* — Kristie A Mahone
(74) *Attorney, Agent, or Firm* — Banner & Witcoff, Ltd.; Michael A. Springs (57) ABSTRACT

Formatting of data entered and/or stored in a financial transaction record may be automatically corrected or modified to an expected or compatible format. The format in which data is to be stored may be defined by a financial institution processing the transaction and/or a customer affected by the transaction. Format rules may be defined and used to judge whether a transaction record parameter meets the required format. If so, the record parameter may be validated and saved. If, however, the parameter is not formatted according to the rule, the system may automatically revise the value stored in the parameter to satisfy the requirements. According to another aspect, if a transaction record has been modified, manual confirmation of the change may be requested.

17 Claims, 8 Drawing Sheets

CASE EDITOR/VIEWER

Transaction ID: 403
Payee: 405
Payor: 407
Original Amount: 409
Correct Amount: 411
Adjustment: 413

Store No. 415
421

PLEASE ENTER A STORE NO. FOR THIS CUSTOMER.

OK 419

SAVE 417

CANCEL 400
401

| PARAMETER | ATTRIBUTE | REQUIREMENT | MODIFICATION |
|---|---|---|---|
| TRANSACTION IDENTIFIER | NUMBER OF CHARACTERS | EQUAL TO 9 | PREPEND '0's |
| STORE NUMBER | BEGINNING CHARACTER | MUST BE A LETTER | PREPEND THE LETTER 'X' |
| MIDDLE NAME | LENGTH | GREATER THAN 1 CHARACTER | APPEND '.' |
| ZIP CODE | DATA TYPE | NUMBERS | ZIPCODE FOR CITY & STATE |

AUTOMATIC MODIFICATION OF FINANCIAL RECORD PARAMETERS

CROSS REFERENCE TO RELATED APPLICATION

This application is a non-provisional application of and claims the benefit of priority from U.S. Provisional Application Ser. No. 61/256,458, entitled "AUTOMATIC MODIFICATION OF FINANCIAL RECORD PARAMETERS," filed on Oct. 30, 2009.

BACKGROUND

Processing of financial transactions is prone to error due to the substantial volume of transactions conducted on a daily basis and the speed with which the transactions must be processed due to customer expectations and demand. Financial record data, for example, may be subject to entry errors. Additionally, an automated financial transaction processing system may expect data to be formatted in a certain manner. Thus, if received data is not appropriately formatted, a customer or financial institution system might not be able to complete the processing of the corresponding transaction.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to one or more aspects, formatting of data entered into a financial transaction record may be automatically corrected or modified to an expected or compatible format. The format in which data is to be stored may be defined by a financial institution processing the transaction and/or a customer affected by the transaction. Format rules may be defined and used to judge whether a transaction record parameter meets the required format. If so, the record parameter may be validated and saved. If, however, the parameter is not formatted according to the rule, the system may automatically revise the value stored in the parameter to satisfy the requirements. In one example, a reference identifier may be appended or prepended by a certain number or letter (e.g., '0' or 'X') to reach a required number of characters. If the identifier is too lengthy, however, the identifier may be truncated.

According to another aspect, if a transaction record has been modified, manual confirmation of the change may be requested. For example, upon automatically modifying a reference number to include 10 digits instead of 8, the system may prompt a user to review and confirm the change. If confirmation is not received, manual review and correction may be requested.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
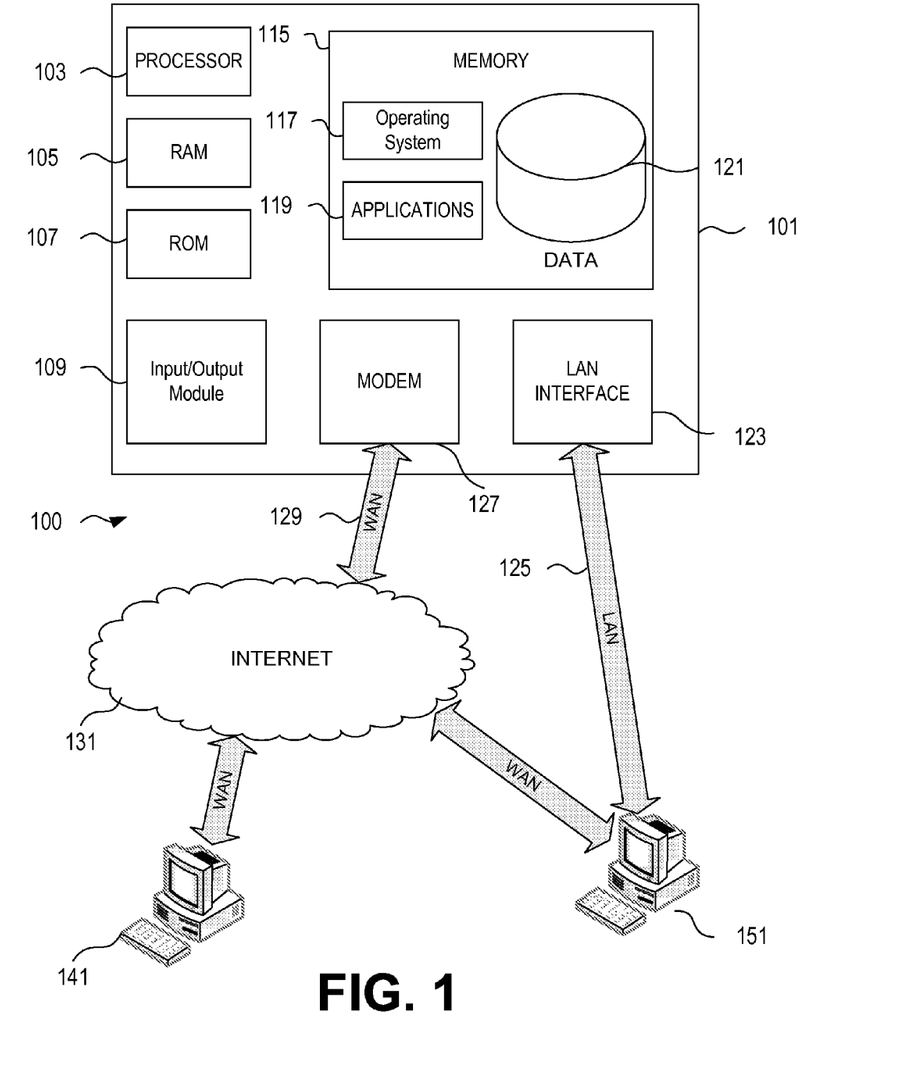
FIG. 1 illustrates an example of a suitable operating environment in which various aspects of the disclosure may be implemented.

FIG. 1 illustrates a block diagram of a generic computing device 101 (e.g., a computer server) in computing environment 100 that may be used according to an illustrative embodiment of the disclosure. The computer server 101 may have a processor 103 for controlling overall operation of the server and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, etc.) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, etc. that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

The system, devices and networks of FIG. 1 may be used, in one or more arrangements, to provide check adjustment functionality. Check adjustments are used to resolve discrepancies between what is claimed as owed or paid and what is actually owed or paid. For example, a check adjustment may be needed where Bank A receives $100 from Bank B for a $1000 check deposited at Bank A. The error may result from a misread of the check, amount entry error, check reference number entry error or the like. Accordingly, an adjustment must be applied to the check transaction to compensate Bank A for the difference, i.e., $900. A system may be used to streamline the research and resolution of check adjustment cases. The system may provide automated workflow procedures for the entry and building of check adjustment cases, organization of check adjustment cases, creation of user interfaces for data entry, editing and viewing of case information including check images, interfacing with legacy and third party applications and the like. For example, the system may receive data from a transaction data collection system and automatically populate fields to build a transaction case.

Figure 2:
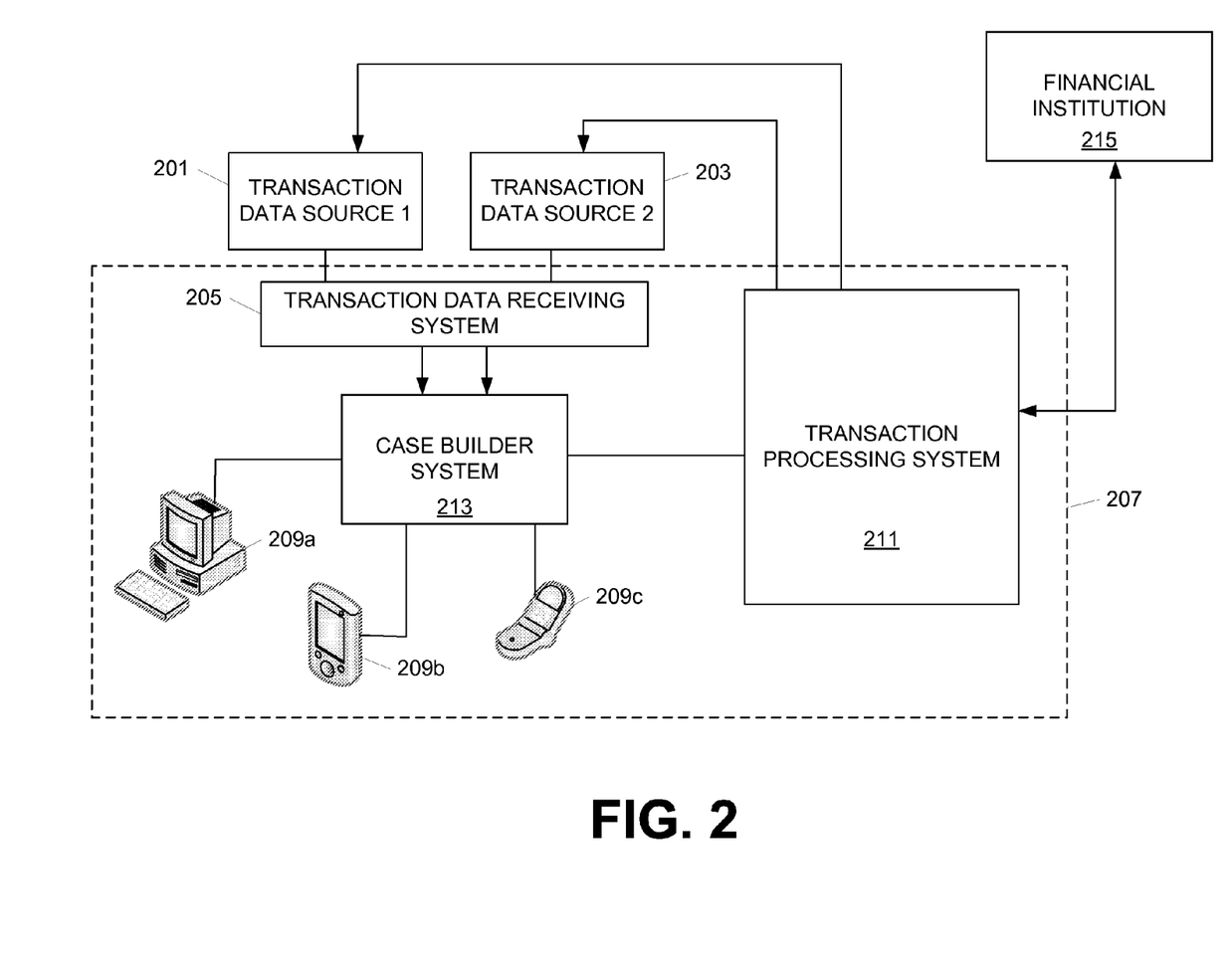
FIG. 2 illustrates an example network environment for processing financial transactions according to one or more aspects described herein.

FIG. 2 illustrates a check adjustment intake and processing system. Check adjustment information and requests may be received from external sources 201 and 203. External sources 201 and 203 may include the Federal Reserve or other third party payment network systems. Check adjustment and other transaction information may be received from each of sources 201 and 203 through a wide area network such as the Internet by a transaction data receiving system 205. Transaction data receiving system 205 may be resident at the financial institution, e.g., institution 207, to which the transactions are directed or may be provided by a third-party. Transaction data receiving system 205 may include interfaces with one or more user terminals 209 configured to receive user input and interactions with the transaction information. For example, users may view, edit and/or otherwise manipulate the data for entry into a check adjustment resolution system such as system 211. In particular, transaction cases that are to be entered into system 211 may be created using case builder system 213. Thus, case builder system 213 may be configured to receive user instructions from terminals 209 and transaction data from sources 201 and 203.

System 211 may act as a data warehouse for check adjustment transaction information in addition to other types of transaction information. System 211 may further be configured to organize case information, facilitate the viewing and editing of transactions, send and receive information to and from various other systems and the like. For example, system 211 may transmit transaction information to external transaction data sources 201 and 203 including a third party payment network including government financial service systems, such as the Federal Reserve, upon resolution of a check adjustment request. In another example, system 211 may communicate with one or more other financial institutions (e.g., institution 215) to indicate that transactions, such as check adjustments, have been resolved or processed. In one or more arrangements each of system 211, user terminals 209 and transaction data receiving system 205 may be resident in financial institution 207.

Figure 3:
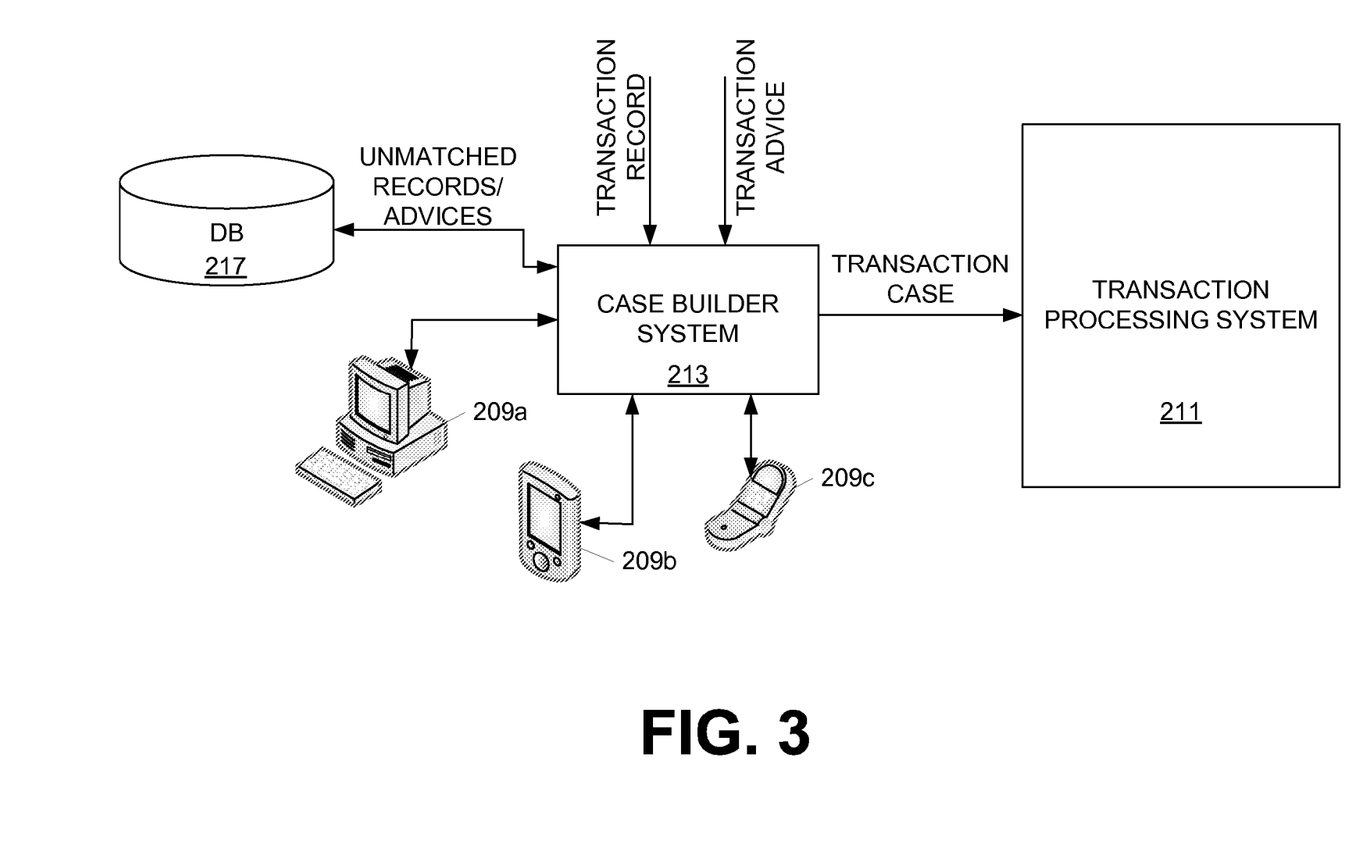
FIG. 3 illustrates an example data flow for generating a transaction case according to one or more aspects described herein.

FIG. 3 illustrates a data flow by which transaction information may be received and matched by a case builder system such as case builder system 213. Case builder system 213 may generally be configured to structure and convert data into a format that is compatible with a transaction processing system such as system 211. Case builder system 213 may further be configured to automatically complete transaction records based on data received from external sources (e.g., sources 201 and 203 of FIG. 2). For example, transactions may include multiple types of information including a transaction record and a corresponding transaction advice that may be received at different times. The transaction record may include information relating to the transaction itself while the transaction advice includes other supplemental information for the transaction such as information for a customer affected by the transaction. Accordingly, in some arrangements, to build a transaction case, both the transaction record and the transaction advice may need to be entered.

Because the transaction record and the transaction advice may be received at different times, e.g., different days, case builder system 213 may warehouse either the transaction record or the transaction advice, whichever is first received, until the matching information is received. For example, case builder system 213 may store as-yet-unmatched transaction records and advices into database 217. Once a corresponding transaction record or advice is received, case builder system 213 may retrieve the stored transaction advice or record from database 217 and generate a case for the transaction. Generating a transaction case may further include manual input and/or review from user terminals 209. The case may then be inputted into transaction process system 211.

As described, data may be received not only from external data sources, but also from system users. For example, some data may be entered manually through terminals 209. In some instances, data may be entered incorrectly or in a format that is not recognized by the processing system 211. For example, if transaction processing system 211 expects a transaction identifier number to include 10 digits, but only 8 have been entered, processing system 211 might not correctly process the transaction. Instead, system 211 may, for example, pass the transaction record for manual review. Thus, according to one or more aspects described herein, case builder system 213 and/or transaction processing system 211 may be configured to verify that data has been entered in a correct format. Formatting may include number of characters, order of characters, capitalization, specific beginning or ending character(s) and the like. If, for example, a reference number is entered into the record with only 8 digits, "12345678," and processing system 211 requires 10 digits for the reference number, case builder system 213 may automatically prefill the number with two leading zeros, resulting in "0012345678." In another example, if a reference number or other transaction record parameter requires that the first character is a letter and is capitalized, a parameter having the value "a3395" may automatically be revised to read "A3995."

Figure 4:
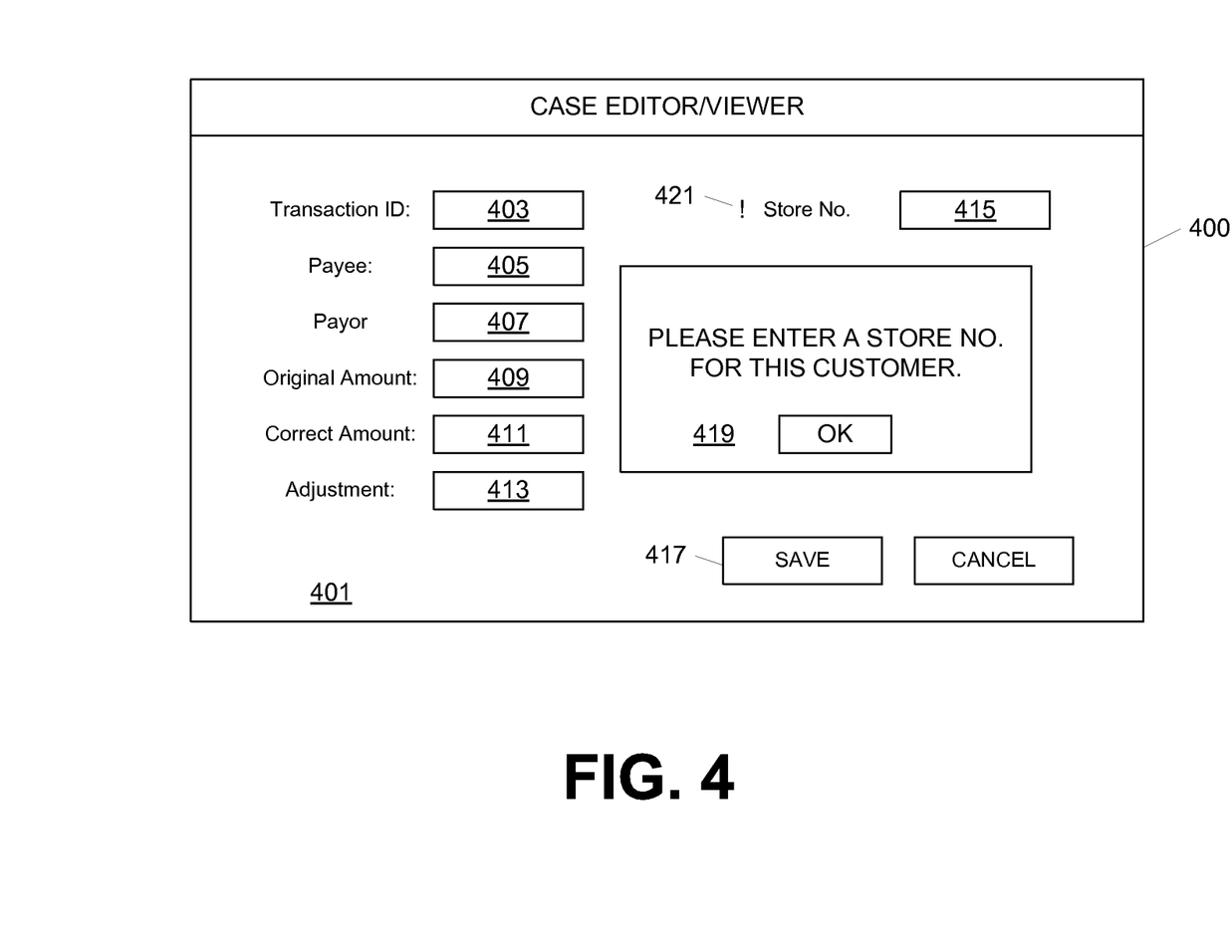
FIG. 4 illustrates an example user interface through which a user may view and edit transaction case information according to one or more aspects described herein.

FIG. 4 illustrates an example user interface for viewing and editing a transaction record. Interface 400 may be displayed at a terminal such as user terminal 205 of FIG. 2. Interface 400 may allow a user to define various fields of the transaction case 401 including transaction ID 403, payee 405, payor 407, original amount 409, corrected amount 411 and adjustment amount 413. Transaction case 401 may further include customer-specific identifiers or fields such as store identifier 415. When a user is finished building or editing case 401, the user may select save option 417 to close the viewing/editing interface 400 and send the case to a transaction processing system (e.g., processing system 211 of FIG. 2). In one or more arrangements, a customer-specific identifier may be required. For example, a customer such as a retail company requests that each transaction include an indication of a store affected by the adjustment. Accordingly, if a customer-specific and requested identifier such as store identifier 415 has not been entered, as is the case in FIG. 4, a prompt 419 may be displayed requesting that the user address the deficiency. Additionally, the deficiency may be identified by marker 421.

Figure 5:
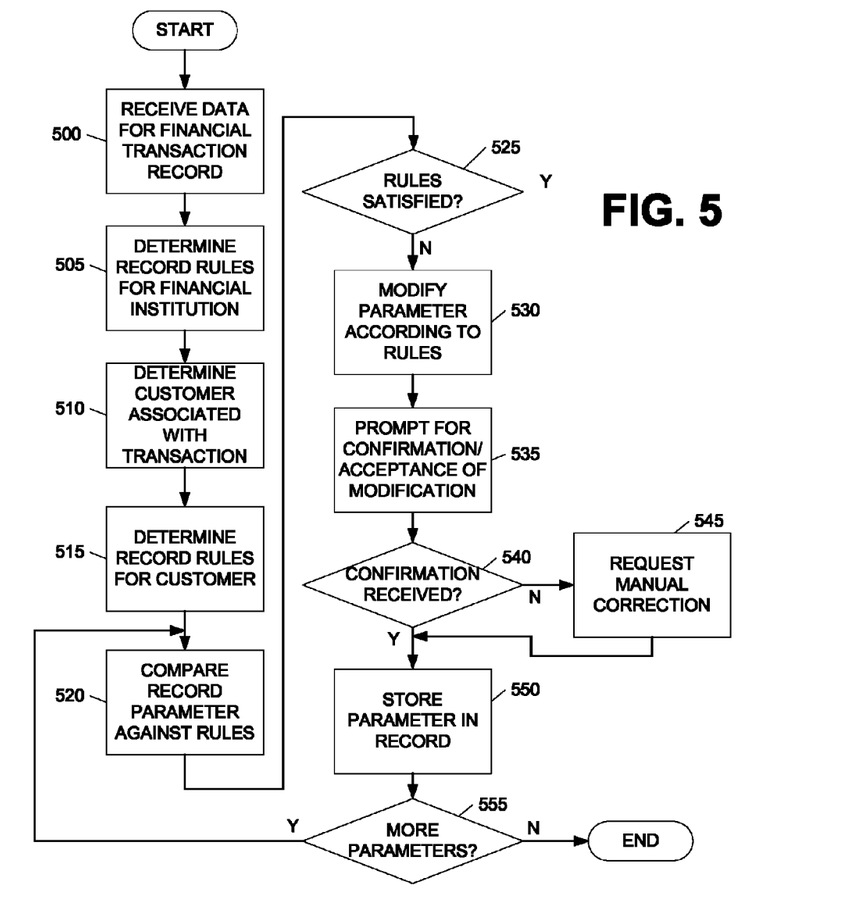
FIG. 5 illustrates a method by which data in the transaction record may be verified and corrected according to one or more aspects described herein.

FIG. 5 is a flowchart illustrating a method by which data for various parameters in a transaction record may be vetted and validated. In step 500, a case builder or processing system may receive data for a transaction record. The data may be stored as parameter-value pairings where a variable corresponds to a type of information included in the record. For example, variables may include first name, last name, street address, zipcode, phone number, record identifier, store number and the like. In step 505, the system may determine transaction record rules for the financial institution. In step 510, the system may further determine a customer associated with the transaction record. For example, the customer may be identified based on a customer number, name, address, phone number, account number and the like included in the transaction record. In step 515, the system may then determine transaction record rules for a customer. As described, a customer may specify their own rules regarding the format in which certain information appears in a transaction record.

In step 520, the system may compare the values assigned to each record parameter against the determined rules. Subsequently, the system may determine whether the values in the record satisfy the determined rules in step 525. In one example, the system may determine whether a rule requiring a certain number of characters for certain variable has been met. In another example, the system may determine whether a rule requiring that a value include a certain number of numbers and/or characters has been satisfied. The makeup of a value may be determined using parsing algorithms to identify alphabetical characters versus numbers, whether a character is capitalized, whether abbreviations have been used (e.g., if a '.' follows a single character) and the like. In step 530, if a rule has not been met, the value of the corresponding parameter may be automatically modified to satisfy the rule. Examples of automatic correction algorithms are further described herein.

Optionally, once the value of a parameter has been modified, a user may be prompted for confirmation of the change in step 535. If confirmation is not received (e.g., if the user indicates that the change is incorrect or if no response is detected within a specified period of time) as determined in step 540, the system may request manual correction of the value in step 545. If confirmation is received or upon receiving manual correction of the value, the modified value may be stored in the parameter and entered into the record in step 550. If additional variables need to be corrected, as determined in step 555, the process may return to step 520.

Figure 6:
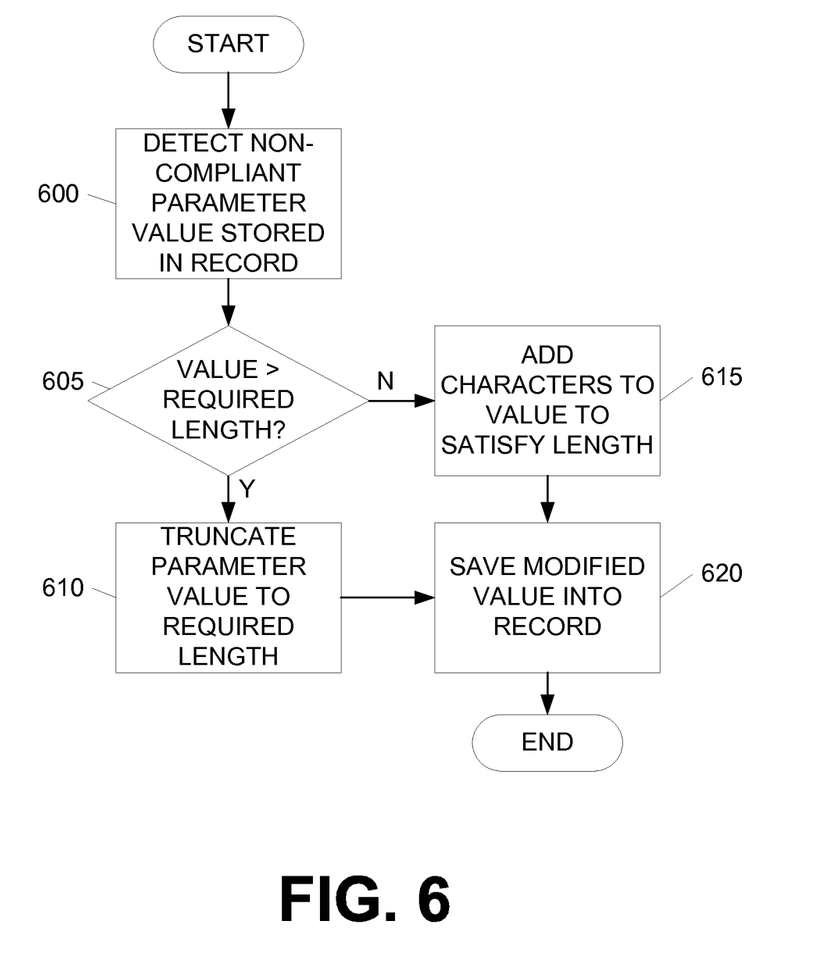
FIG. 6 illustrates a method by which a parameter of a financial transaction record may be modified based on a length requirement according to one or more aspects described herein.

FIG. 6 illustrates an example method for automatically correcting a non-compliant value in a transaction record. In step 600, the system may detect that a value stored in a transaction record does not comply with a required length rule for that particular variable or record parameter. The rules may either be desired and/or required by the customer associated with the transaction or the financial institution. In one example, the variable or parameters may correspond to an account number field of the record. A processing system may require that the account number include 8 digits for proper interpretation and processing. Thus, a system might not be able to process account numbers that are smaller or larger than 8 digits. In step 605, the system may determine whether the value is greater than the required length. If so, the system may proceed to step 610 where the account number is automatically truncated. The system may truncate the account number based on a default position. For example, the system might always truncate the leading portion of the account number. Alternatively, the system might always truncate the trailing portion of the account number. In another example, the system may determine whether there are leading or trailing zeroes. In such arrangements, the system may truncate the leading portion if the value includes leading zeroes but not trailing zeroes. Alternatively, the system may truncate the trailing portion if the value includes trailing zeroes but not leading zeroes. Various other truncation algorithms and techniques may also be applied.

If, on the other hand, the value is less than the required length, the system may append or prepend a specified number, character or symbol to the value in step 615. In the above example of account numbers, the account number may be prepended with zeroes. Alternatively, the account number may be appended with zeroes depending on the operating procedures of the processing system and protocols and standards used by the financial institution. Once the value has been corrected for format, the value may be saved into the transaction record in step 620.

In one or more arrangements, a record parameter may be modified according to instructions from the customer. For example, if a store number is required to have 4 digits, the customer may specify whether a store number having less than 4 digits should be prepended or appended with a certain number, character or symbol. Similarly, if the store number has greater than 4 digits, the customer may specify whether the store number should be truncated from the front or the back. Alternatively, the customer may ask that a non-compliant store number be automatically corrected in some other fashion such as replacement with an asterisk ("*"), a specific word or number (e.g., "ERR!" for error, or "0000" representing an error code) or deleting the field and leaving it blank.

Figure 7:
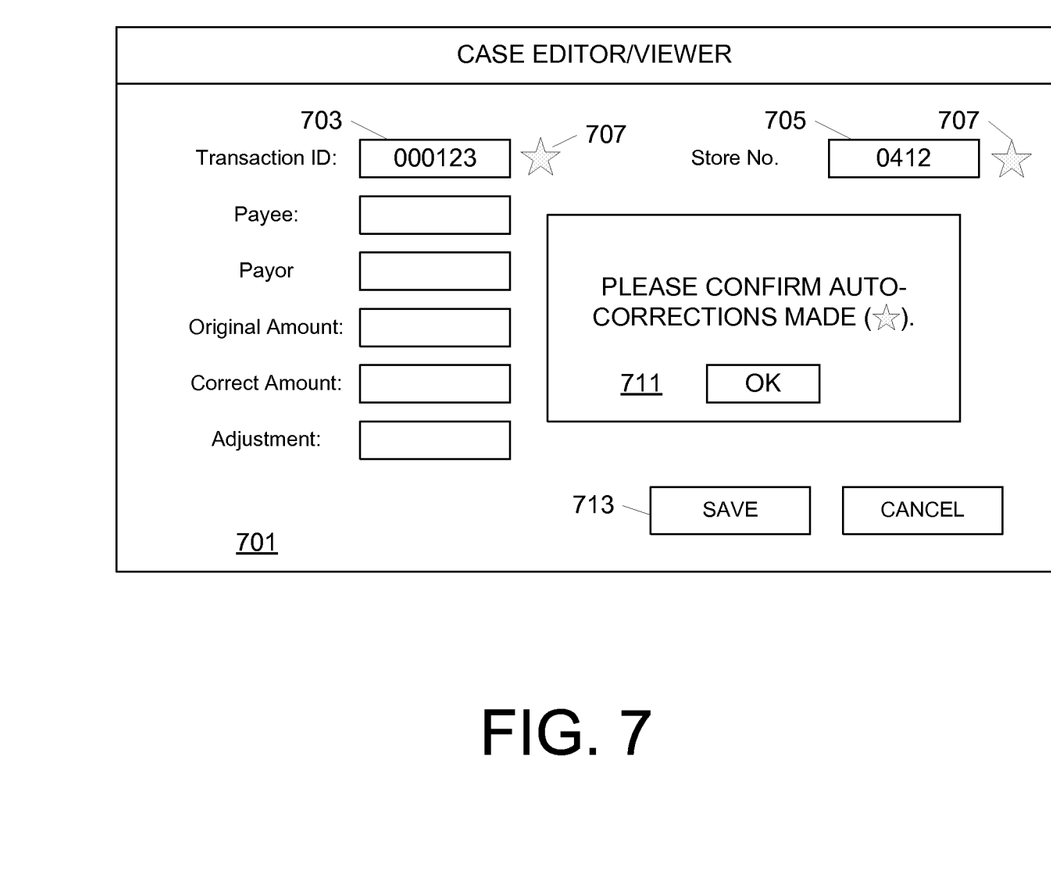
FIG. 7 illustrates an example user interface prompting a user to verify changes to the transaction record.

FIG. 7 illustrates an example user interface where a prompt is displayed requesting confirmation of a correction made to a record parameter. User interface 701 includes a transaction identifier 703 and a store number parameter 705. In the situation where a user enters an identifier that is only three digits long, e.g., "123," and the system or the customer requires an identifier that is 6 digits long, the system may prepend three zeroes to the identifier, resulting in "000123" as illustrated. In another example, store number 705 may have originally been entered as "412." However, the system or the customer may require that the store number comprise four digits for proper identification and processing. Accordingly, the system may append a zero to store number 709 to satisfy this rule. Indicators 707 may be used to identify those parameters that have been corrected by the system based on specified rules. Prompt 711 may be used to request manual confirmation that the parameters modified were modified appropriate and/or correctly. Alternatively, prompt 711 might not be provided. Instead, confirmation may be received by a user selecting save option 713.

Figure 8:
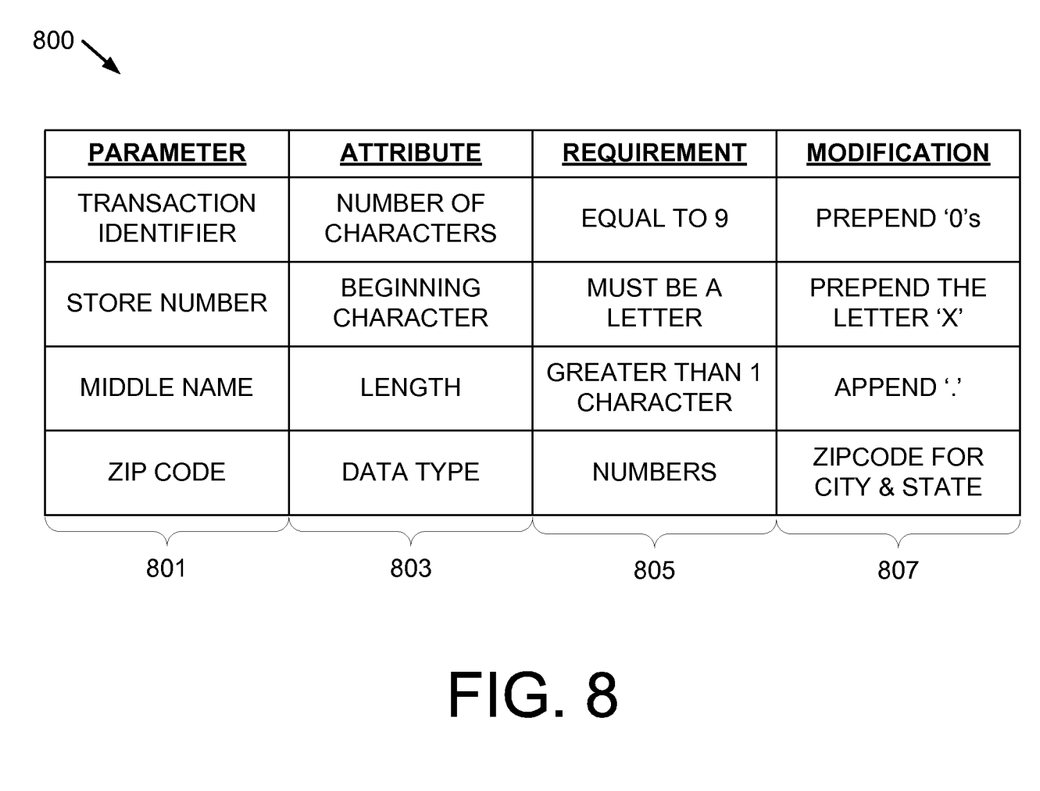
FIG. 8 illustrates an example rules table specifying format and appearance preferences or requirements for transaction record parameters according to one or more aspects described herein.

FIG. 8 illustrates a table of rules that may be used to identify a preferred or desired formatting for particular parameters in a transaction record. Table 800 may include multiple data columns including a parameter column 801 identifying the parameter in a transaction record to evaluate, attribute 803 of the parameter to evaluate, requirement 805 specifying the required formatting or appearance of the parameter and attribute and a modification rule 807. Modification rule 807 may specify a manner in which non-compliant parameters are to be modified. For example, a zip code parameter may have a requirement that the data type include only numbers. In the event a zip code is entered with letters, the modification rule dictates that a zip code corresponding to a city and state specified in the transaction record is to be used. The zip code may be a default zip code stored in the system or retrieved from an external database. In another example, all store numbers may be required to begin with a letter. Accordingly, those store numbers that do not begin with a letter may be prepended with a default character such as 'X.' In yet another example, middle names specified in a transaction record (e.g., for contact information) may be required to have more than 1 character. If a middle name is determined to have 1 character, for example, the system may automatically append a '.' to indicate it is an abbreviation. Various other rules and modification requirements may be specified and used according to the needs, desires and capabilities of a financial institution or customer.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

The invention claimed is:

1. A method comprising:
   receiving, by a financial record processing system having at least one processor, data corresponding to a financial transaction submitted for processing;
   generating, by the financial record processing system, an initial transaction record for the financial transaction;
   receiving a transaction advice separately and at a different time from the data corresponding to the financial transaction, wherein the transaction advice includes information for a customer affected by the financial transaction;
   determining, by the financial record processing system, whether the transaction advice corresponds to the initial transaction record;
   in response to determining that the transaction advice corresponds to the initial transaction record:
      generating, by the financial record processing system, a transaction case to include the initial transaction record and the transaction advice;
      determining, by the financial record processing system, a customer associated with the financial transaction based on information included in the transaction case;
      determining a first format based on the determined customer associated with the transaction case, wherein the first format includes a predefined number of characters;
      determining, by the financial record processing system, whether a first parameter of the transaction case is formatted according to the first format;
      in response to determining that the first parameter of the transaction case is not formatted according to the first format:
         automatically modifying, by the financial record processing system, the first parameter to match the first format including the predefined number of characters;
         request manual confirmation of the automatic modification of the first parameter; and
         in response to not receiving manual confirmation of the automatic modification within a specified amount of time, requesting manual correction of the first parameter;
      determining whether a customer-specific parameter is required based on the customer information included in the transaction case; and
      in response to determining that a customer-specific parameter is required:
         determining whether the customer-specific parameter has been entered in the transaction case; and
         in response to determining that the customer-specific parameter has not been entered in the transaction case, prompting for the customer-specific parameter.

2. The method of claim 1, wherein determining that the first parameter is not formatted according to the first format includes determining that the first parameter includes a number of characters greater than the predefined number of characters; and
   wherein automatically modifying the first parameter to match the first format includes truncating the first parameter.

3. The method of claim 1, wherein determining that the first parameter is not formatted according to the first format includes determining that the first parameter includes a number of characters less than the predefined number of characters; and wherein automatically modifying the first parameter to match the first format includes adding one or more characters to the first parameter.

4. The method of claim 3, wherein the one or more characters include zeroes.

5. The method of claim 1, further comprising prompting for manual confirmation that the modification is correct upon automatically modifying the first parameter.

6. The method of claim 1, further comprising determining the first format based on a type of financial parameter of the first parameter.

7. The method of claim 1, wherein the first format is specified by the customer affected by the financial transaction.

8. An apparatus comprising:
   a processor; and
   memory operatively connected to the processor and storing computer readable instructions, that when executed, cause the apparatus to:
   receive, at a financial institution, data corresponding to a financial transaction submitted for processing;
   generate an initial transaction record for the financial transaction;
   receive a transaction advice separately and at a different time from the data corresponding to the financial transaction, wherein the transaction advice includes information for a customer affected by the financial transaction;
   determine, whether the transaction advice corresponds to the initial transaction record;
   in response to determining that the transaction advice corresponds to the initial transaction record:
      generate, a transaction case to include the initial transaction record and the transaction advice;
      determine, a customer associated with the financial transaction based on information included in the transaction case;
      determine a first format based on the determined customer associated with the transaction case, wherein the first format includes a predefined number of characters;
      determine, whether a first parameter of the transaction cases is formatted according to the first format;
      in response to determining that the first parameter of the transaction case is not formatted according to the first format:
         automatically modify the first parameter to match the first format including the predefined number of characters;
         request manual confirmation of the automatic modification of the first parameter; and
         in response to no receipt of confirmation manual confirmation of the automatic modification within a specified amount of time, request manual correction of the first parameter;
      determine whether a customer-specific parameter is required based on the customer information included in the transaction case; and
      in response to determining that the customer-specific parameter is required:
      determine whether the customer-specific parameter has been entered in the transaction case; and
      in response to determining that the customer-specific parameter has not been entered in the transaction case, prompt for the customer-specific parameter.

9. The apparatus of claim 8, wherein determine that the first parameter is not formatted according to the first format includes determine that the first parameter includes a number of characters greater than the predefined number of characters; and
   automatically modify the first parameter to match the first format includes a truncation of the first parameter.

10. The apparatus of claim 8, wherein determine that the first parameter is not formatted according to the first format includes determine that the first parameter includes a number of characters less than the predefined number of characters; and automatically modifying the first parameter to match the first format includes adding one or more characters to the first parameter.

11. The apparatus of claim 10, wherein the one or more characters include zeroes.

12. The apparatus of claim 8, wherein the computer readable instructions, when executed, further cause the apparatus to determine the first format based on a type of financial parameter of the first parameter.

13. One or more non-transitory computer readable media storing computer readable instructions that, when executed, cause an apparatus to:
   receive, at a financial institution, data corresponding to a financial transaction submitted for processing;
   generate an initial transaction record for the financial transaction;
   receive a transaction advice separately and at a different time from the data corresponding to the financial transaction, wherein the transaction advice includes information for a customer affected by the financial transaction;
   determine, whether the transaction advice corresponds to the initial transaction record;
   in response to determining that the transaction advice corresponds to the initial transaction record:
      generate, a transaction case to include the initial transaction record and the transaction advice;
      determine, a customer associated with the financial transaction based on information included in the transaction case;
      determine a first format based on the determined customer associated with the transaction case, wherein the first format includes a predefined number of characters;
      determine, whether a first parameter of the transaction cases is formatted according to the first format;
      in response to determining that the first parameter of the transaction case is not formatted according to the first format:
         automatically modify the first parameter to match the first format including the predefined number of characters;
         request manual confirmation of the automatic modification of the first parameter; and
         in response to no receipt of confirmation manual confirmation of the automatic modification within a specified amount of time, request manual correction of the first parameter;
      determine whether a customer-specific parameter is required based on the customer information included in the transaction case; and
      in response to determining that the customer-specific parameter is required:
      determine whether the customer-specific parameter has been entered in the transaction case; and
      in response to determining that the customer-specific parameter has not been entered in the transaction case, prompt for the customer-specific parameter.

14. The one or more computer readable media of claim 13, wherein determine that the first parameter is not formatted according to the first format includes determine that the first parameter includes a number of characters greater than the predefined number of characters; and
 automatically modify the first parameter to match the first format includes a truncation of the first parameter.

15. The one or more computer readable media of claim 13, wherein determine that the first parameter is not formatted according to the first format includes determine that the first parameter includes a number of characters less than the predefined number of characters; and
 automatically modify the first parameter to match the first format includes adding one or more characters to the first parameter.

16. The one or more computer readable media of claim 15, wherein the one or more characters include zeroes.

17. The one or more computer readable media of claim 13, wherein the computer readable instructions, when executed, further cause the apparatus to determine the first format based on a type of financial parameter of the first parameter.

\* \* \* \* \*